United States Patent [19]
Hara

[11] Patent Number: 4,570,740
[45] Date of Patent: Feb. 18, 1986

[54] MOTORCYCLE
[75] Inventor: Kunitaka Hara, Saitama, Japan
[73] Assignee: Honda Giken Kogyo Kabushiki Kaisha, Tokyo, Japan
[21] Appl. No.: 654,165
[22] Filed: Sep. 24, 1984
[30] Foreign Application Priority Data Sep. 26, 1983 [JP] Japan ................. 58-177559

[51] Int. Cl.⁴ ............ B62D 61/02; B60K 11/00; B60K 11/04; B62K 1/00
[52] U.S. Cl. ................ 180/229; 180/68.1; 180/68.4; 280/289 S
[58] Field of Search ........... 180/219, 229, 312, 68.4, 180/68.1; 296/78.1; 280/289 S

[56] References Cited
U.S. PATENT DOCUMENTS 2,792,899  5/1957  Piatti ..................... 180/229
4,237,996 12/1980  Matsuda et al. ........ 180/229
4,396,086  8/1983  Hattori .................. 180/229

FOREIGN PATENT DOCUMENTS 0021657 1/1981 European Pat. Off. ........... 180/229

Primary Examiner—John J. Camby
Attorney, Agent, or Firm—Lyon & Lyon

[57] ABSTRACT

A motorcycle having a radiator mounted forwardly of the fuel tank and above the engine. The motorcycle further includes a cowling extending from forwardly of the radiator to either side of the motorcycle. A radiator baffle plate is positioned between the radiator and the fuel tank. This plate includes a downwardly extending panel which is positioned between the radiator and the fuel tank and which further extends rearwardly on either side of the motorcycle to positions to either side of and adjacent the forward portion of the fuel tank. Passageways are created between the cowling and the downwardly extending panel to direct the air heated by the radiator downwardly and to the side of the motorcycle for discharge without impinging upon the rider.

4 Claims, 14 Drawing Figures

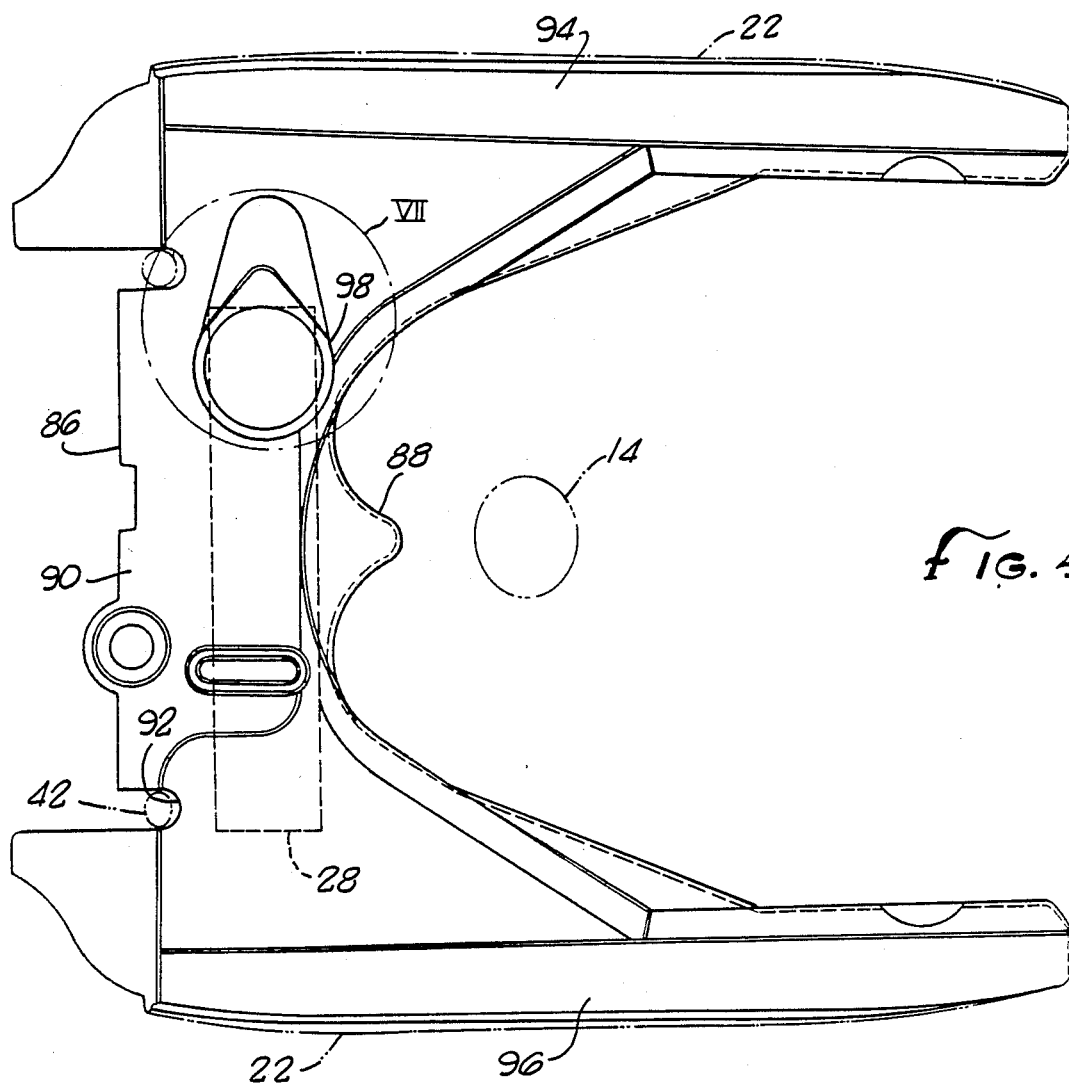
fig. 4.
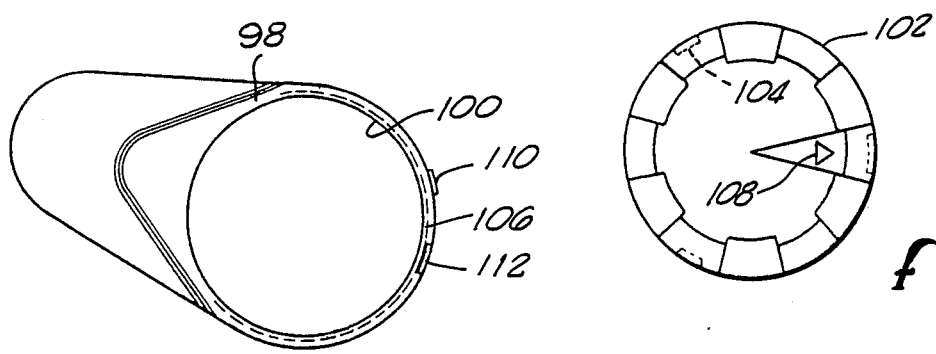
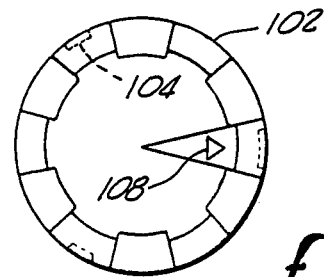
fig. 7.
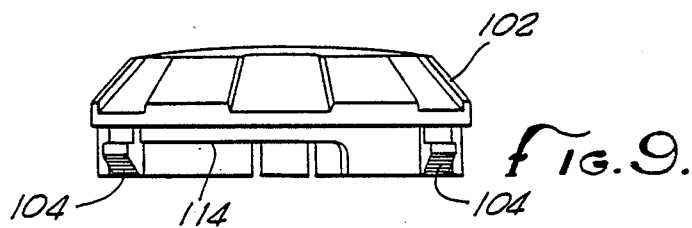
fig. 8.
fig. 9.

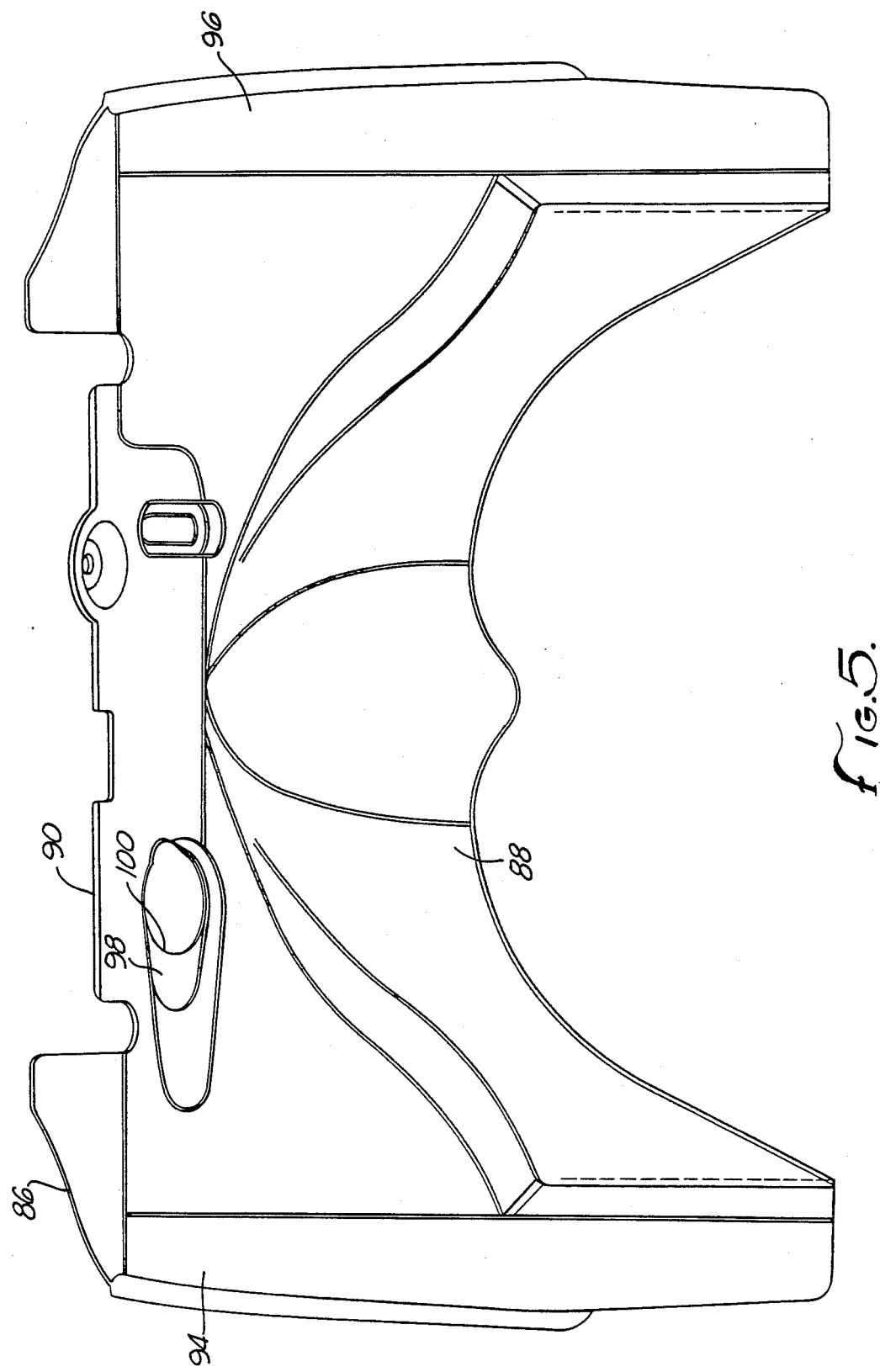

MOTORCYCLE

BACKGROUND OF THE INVENTION

The field of the present invention is motorcycles employing the water cooled engine and particularly the arrangement thereof.

Motorcycles employing water cooled engines have generally been arranged with one or more radiators located forwardly of the engine on the motorcycle frame. Fuel tanks are most commonly located on the frame above the engine and radiators have been located forwardly of such tanks as well. The location of a radiator high on the motorcycle frame forwardly of a fuel tank is advantageous because they are less subjected to mud, stones and the like. Consequently, they are less likely to be clogged or damaged. However, the placement of radiators in front of the fuel tank of a motorcycle tends to result in hot air discharged through the radiator to be directed toward the motorcycle rider. Such direction of heat toward the rider is generally unacceptable. Consequently, such considerations have generally resulted in the radiator being placed directly in front of the engine, low enough to avoid hot air impingement on the rider.

SUMMARY OF THE INVENTION

The present invention pertains to the arrangement of a motorcycle employing a water cooled engine wherein the radiator is located in front of the fuel tank of the vehicle. A radiator baffle plate is positioned above the radiator and has a downwardly extending panel to direct air away from the rider and to either side of the motorcycle with the panel terminating to either side of the front of the fuel tank.

With the foregoing arrangement, the radiator may be located high on the vehicle in a location so as not to be subjected to stones and mud. Additionally, the hot air discharged from the radiator does not impinge upon the rider. An access port may be provided through the radiator cover for servicing of coolant and the like.

In view of the foregoing, it is an object of the present invention to provide an improved radiator arrangement for a motorcycle. Other and further objects and advantages will appear hereinafter.

BRIEF DESCRIPTION OF THE DRAWINGS

FIG. 4 is a top view of a baffle plate of the present invention.

FIG. 5 is a front view of the baffle plate of FIG. 4.

FIG. 7 is a detail plan view of an access hole on the baffle plate.

FIG. 8 is a plan view of a cover for the access hole.

FIG. 9 is an elevation of the cap of FIG. 8.

DETAILED DESCRIPTION OF THE PREFERRED EMBODIMENT

Figure 1:
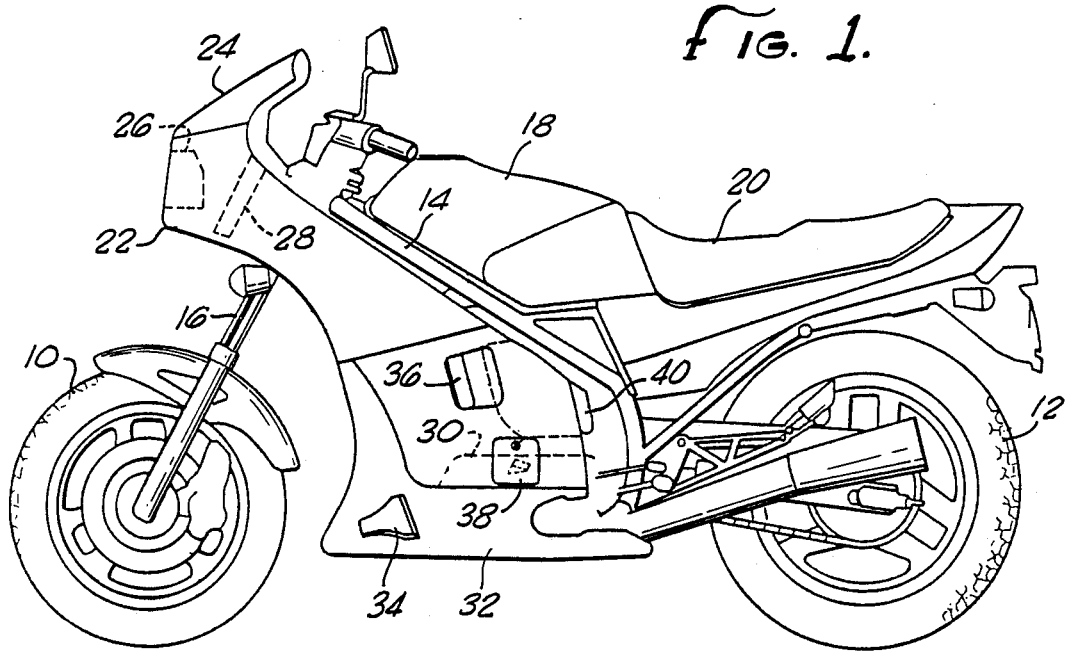
FIG. 1 is a side view of a motorcycle illustrating the location of a radiator in the present invention.

Turning in detail to the drawings, FIG. 1 illustrates a motorcycle having front and rear wheels 10 and 12 resiliently mounted to a body frame 14. The front wheel 10 is mounted on a front fork 16 pivotally arranged on the body frame 14. A fuel tank 18 is mounted on the body frame 12 as is a seat 20.

The motorcycle is also shown to include a front cowling 22 having a wind screen 24. The cowling 22 extends aft on either side of the frame 14 from a forward position ahead of the front fork 16. Forwardly of the front fork, a headlight 26 and a radiator 28 are located within the cowling 22. As can be seen by the relative positions of the components in FIG. 1, the radiator 28 is located high on the motorcycle in front of the fuel tank 18. An engine 30 is mounted to the frame 14 below the fuel tank 18. The engine 30 is contained within an under cowl 32. The under cowl 32 includes an air inlet 34, an air outlet 36 and an equipment cover 38. A tour box 40 is also shown to be located within the under cowl 32.

Figure 2:
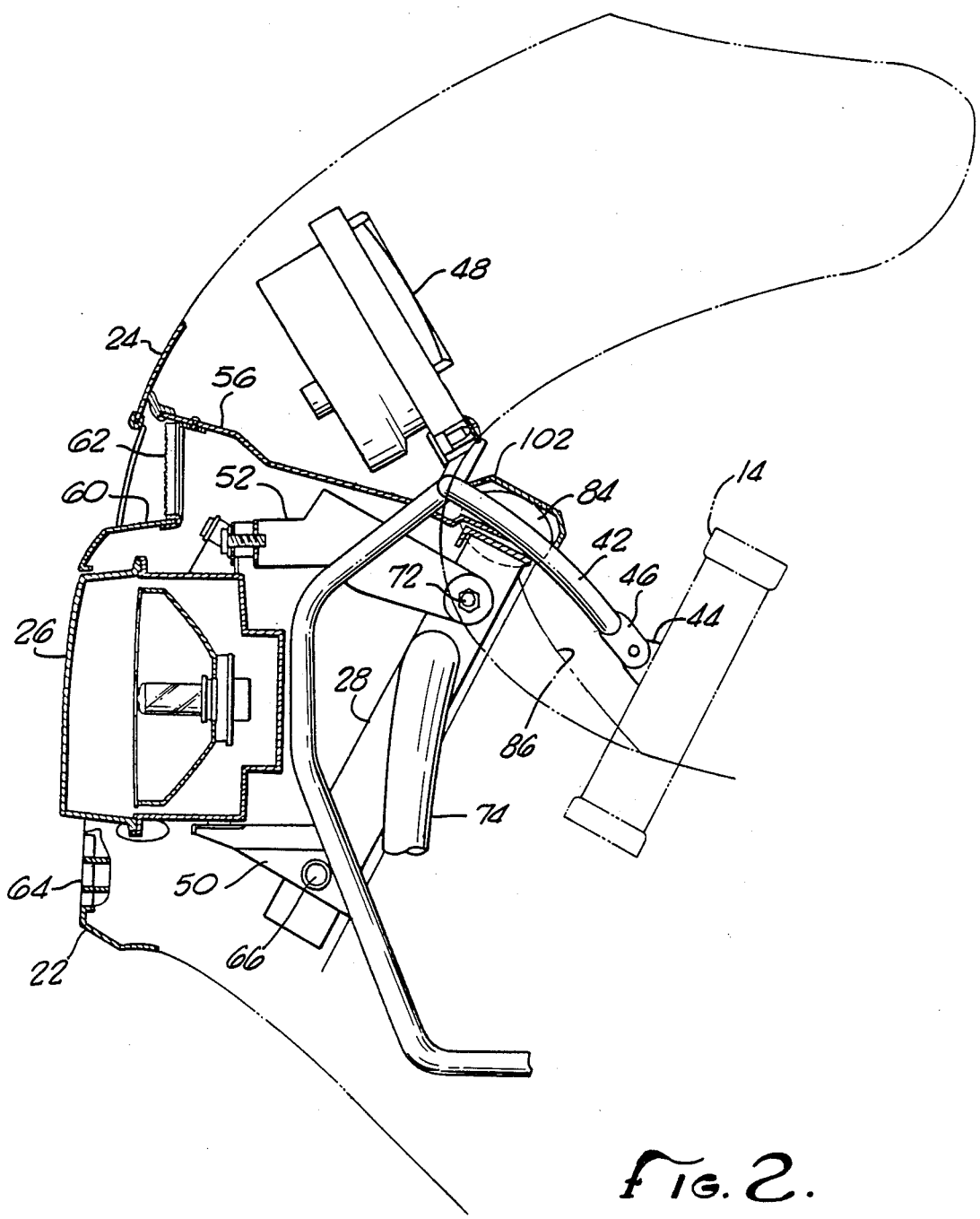
FIG. 2 is a cross-sectional side view of the forward portion of the motorcycle of FIG. 1.
Figure 3:
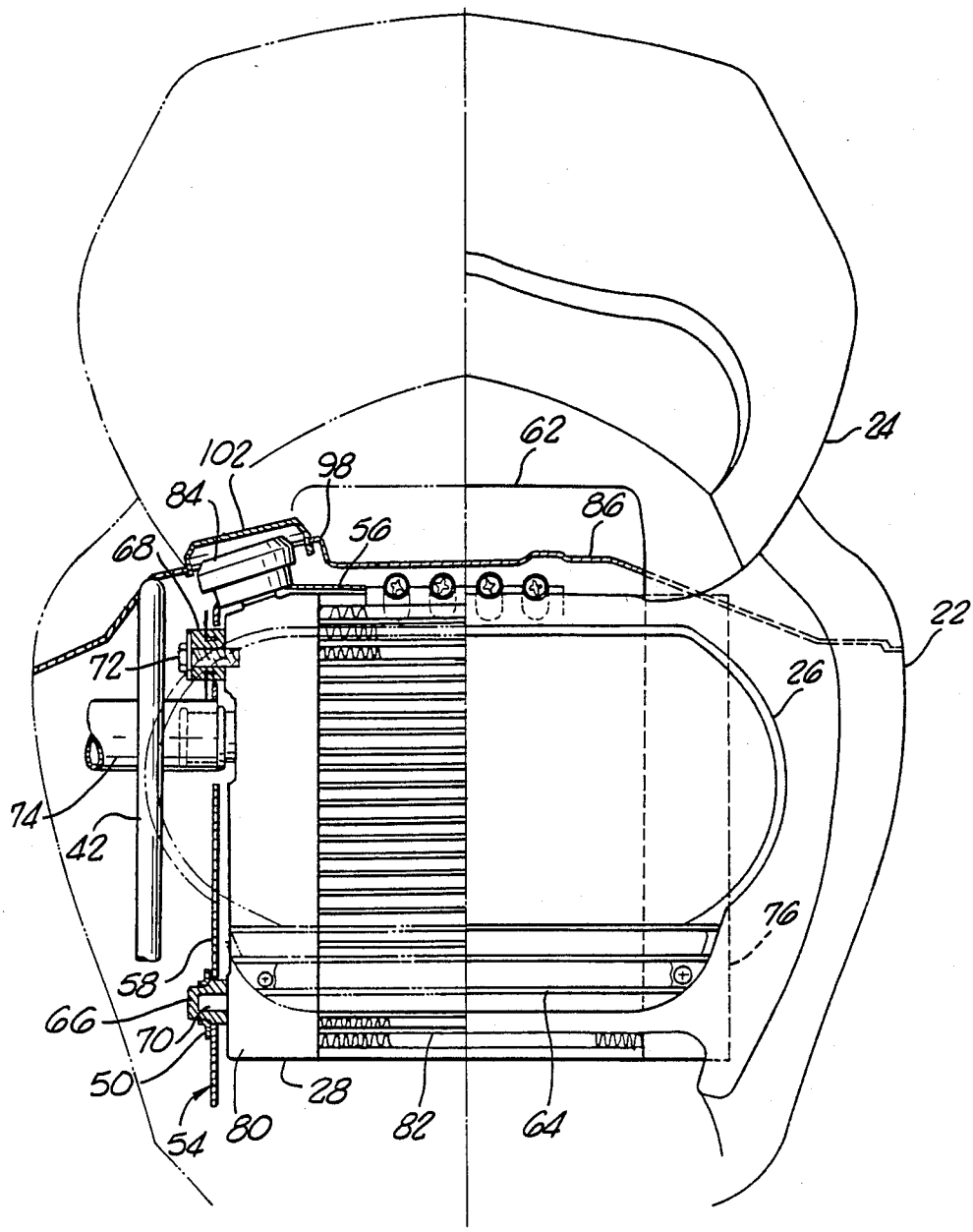
FIG. 3 is a front view partially in section of the upper front portion of the motorcycle of FIG. 1.
Figure 10:
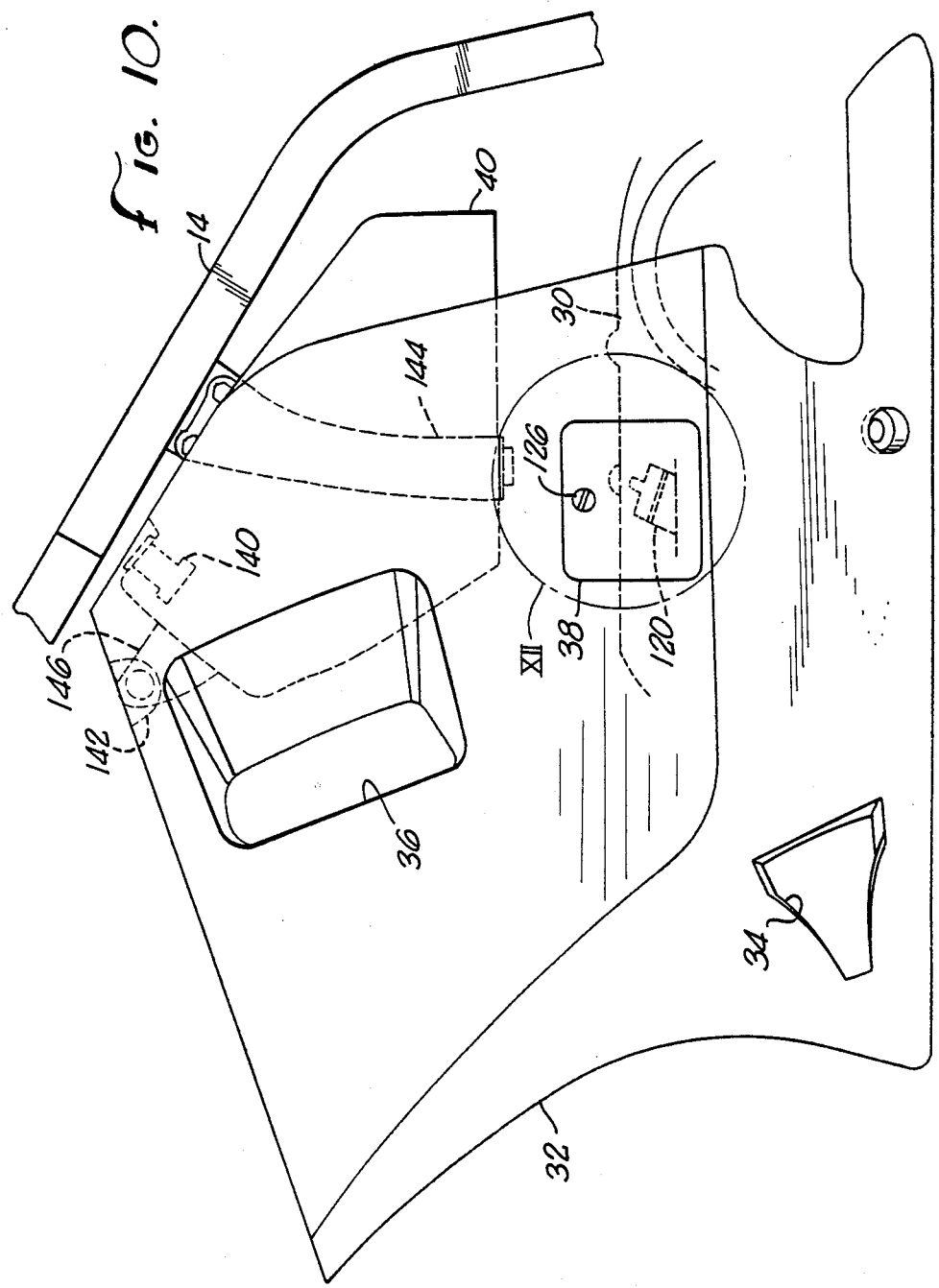
FIG. 10 is a side view of an under cowl associated with the present invention.
Figure 12:
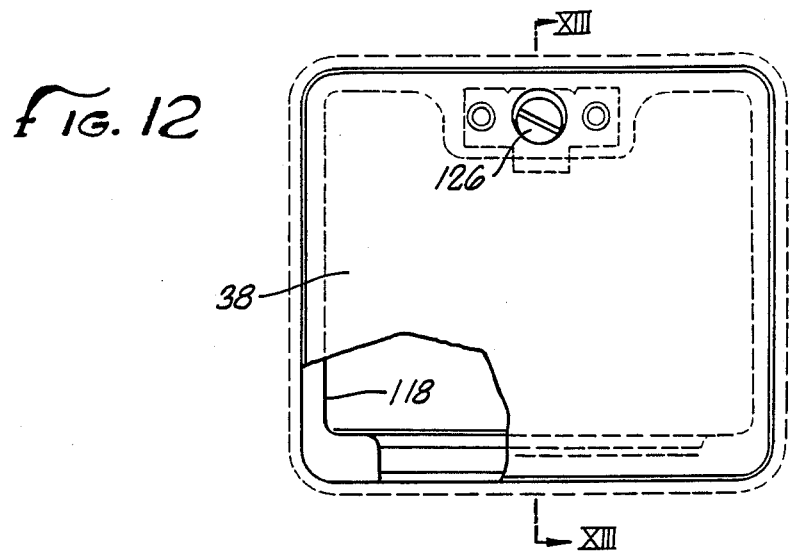
FIG. 12 is an enlarged view of the oil entrance.
Figure 13:
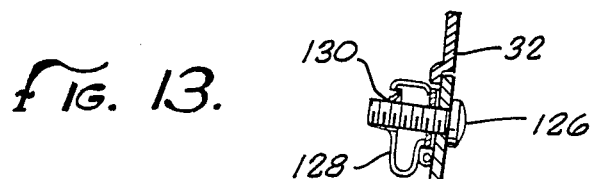
FIG. 13 is a cross-sectional elevation taken along line XIII—XIII.
Figure 11:
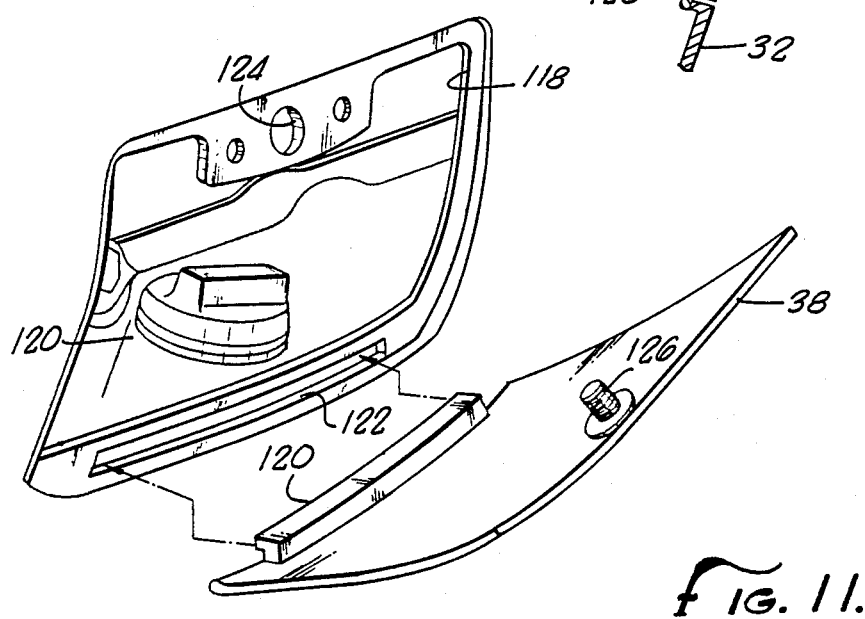
FIG. 11 is an oblique view illustrating the oil entrance on the under cowl.

Turning next to FIGS. 2 and 3, the front, upper portion of the motorcycle is illustrated in greater detail. Extending forwardly from the head pipe portion of the body frame 14 is an installation frame 42. A bracket 44 on the head pipe supports a mounting plate 46 to which the installation frame is attached. A meter unit 48 is affixed to the installation frame 42 adjacent its upper extent.

The installation frame 42 includes a bracket 50 fixed thereto. The bracket 50 in part supports the headlight assembly 26 in cooperation with a stay 52 fixed to the radiator 28. Two such brackets 50 may be provided on either side of the radiator 28.

Located within the cowling 22 is a wind duct 54. The wind duct extends from the cowling 22 rearwardly to the radiator 28. The wind duct includes an upper plate 56 and two side plates 58. Located in the cowling 22 is an air entrance 60 leading to an upper grill 62. A lower grill 64 beneath the headlight 26 also extends through the cowling 22. The grills 62 and 64 direct air inwardly through the wind duct 54 to the radiator 28. The brackets 50 are associated with the side plates 58. Rubber mounting elements 66 and 68 retain the radiator relative to the side plates 58 and the brackets 50. Pins 70 extend from the radiator 28 for positioning in the rubber mounting element 66. Bolts 72 locate the rubber mounting element 68 with the radiator 28 as well.

Looking to the radiator, a water outlet pipe 74 extends from a first tank 76 while a water inlet pipe 78 extends from a second radiator tank 80. Cooling tubes 82 extend between the tanks 76 and 80 with fins thereon for increased heat transfer. A radiator cap 84 is associated with the second radiator tank 80 at the top thereof for servicing the system.

Figure 6:
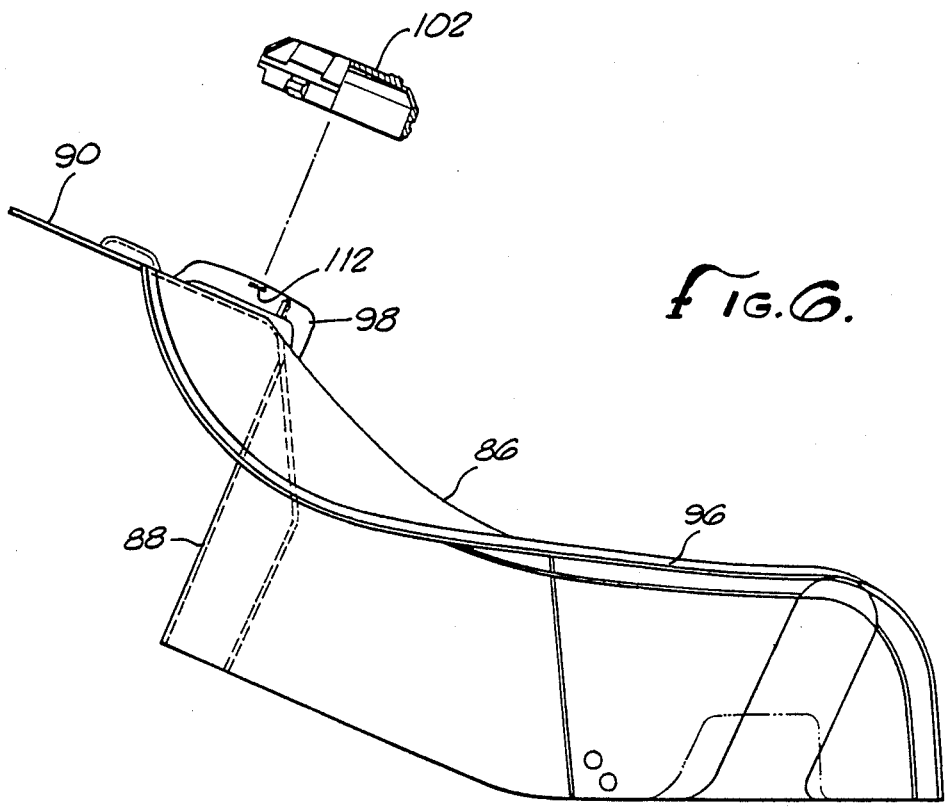
FIG. 6 is a side view of the baffle plate of FIG. 4.

Partially illustrated in FIGS. 2 and 3 and more completely illustrated in FIGS. 4, 5 and 6 is a radiator baffle plate 86. The radiator baffle plate 86 extends across the width of the cowling 22 as can best be seen in FIG. 3. The radiator baffle plate 86 extends rearwardly from above the radiator 28. A downwardly extending panel 88 extends behind the radiator 28 and ahead of the fuel tank 18 in a downwardly direction therebetween to direct air flowing through the radiator 28 downwardly and outwardly of the vehicle to avoid the rider. The baffle plate extends rearwardly to either side of the front portion of the fuel tank 18 for further hot air baffling.

The radiator baffle plate 86 includes a ceiling plate 90 which extends over the radiator 28. Slots 92 in the leading edge of the ceiling plate 90 provide clearance for the installation frame 42. Partition plates 94 and 96 extend rearwardly from the ceiling plate 90 about the downwardly extending panel 88. The partition plates extend outwardly to the cowling 22 in order that air flow beneath the ceiling plate will flow outwardly and downwardly around the panel 88.

Formed in the ceiling plate 90 is a raised boss 98. A hole is located in the boss 98. The hole 100 provides access to the radiator cap 84. Positioned in the hole 100 is a cover 102.

The cover 102 includes resilient claws 104 which engage a lip 106 on the hole 100. To align the cover 102, an arrow 108 on the cover 102 may be aligned with a matching arrow 110 located on the sidewall of the boss 98. A concavity 112 is arranged on the boss 98. Part of the skirt 114 is shown to be cut away from the cover 102 in FIG. 9.

Looking then to FIGS. 10–14, an under cowl 32 is illustrated. Its location may best be observed with reference to FIG. 1. The under cowls 32 are associated with the lower forward portion of the body of the motorcycle. The under cowls are positioned to cover portions of the motorcycle including the engine 30, the tour box 40 and portions of the frame 14 as well as other attendant mechanisms. An air inlet 34 extends through the cowl 32 as does an air outlet 36. An equipment cover 38 closes a port 118 in the under cowl 32. The port 118 provides access to an oil filler port 120.

The equipment cover 38 associated with the port 118 is constructed to provide ready access with full removal of the equipment cover 38 when opened. To this end, a broad hook 120 is positioned within a slot 122 and pivoted into interlocking engagement therewith by placement of the equipment cover 38 flush against the under cowl 32. A hole 124 located in the under cowl 32 at the margin of the port 118 receives a fastener mechanism or bolt 126. Associated with the hole 124 is an installation member 128 having a hole 130 therethrough for engagement of the bolt 126 to retain the cover 38 in position.

Figure 14:
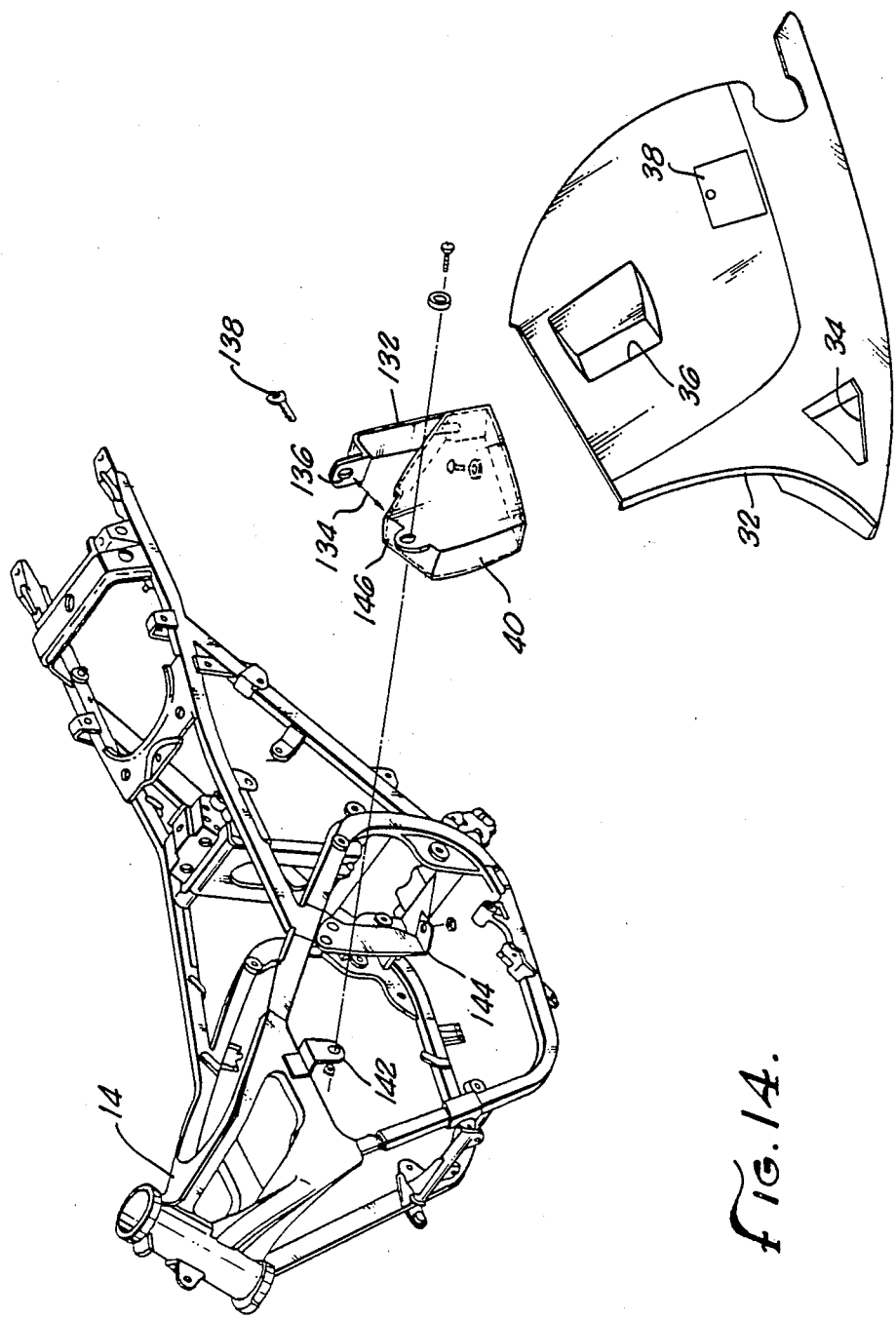
FIG. 14 is an oblique view of a frame of a motorcycle associated with the present invention with portions in exploded assembly relationship therewith.

Looking lastly to FIG. 14, the construction of the tour box 40 is shown. The tour box 40 includes a cover 132 which actuates as indicated by the arrow 134. A lock is located in alignment in the tour box 40 with a locking hole 136 on the cover 132. A key 138 is employed to operate the lock 140 which is illustrated more specifically in FIG. 10.

The tour box 40 is mounted to the frame 14 of the motorcycle by means of a first bracket 142 and a stay 144. The bracket 142 is associated with an attachment lug 146 on the tour box while the stay 144 is associated with the bottom of the tour box 40, both by conventional bolting means.

Thus, a motorcycle arrangement is disclosed which accommodates a radiator mounted high in the motorcycle forwardly of a conventionally-arranged fuel tank. In this arrangement, air flows around the headlamp 26 to the radiator 28. The air heated by the radiator 28 is then passed below the ceiling plate 90 and around the downwardly extending panel 88 to a position within the cowl 22 where it may be exhausted either through the motorcycle mechanism or through the outlets 36. As such, an advantageous radiator location is achieved while heat is directed away from the rider.

Accordingly, an improved motorcycle arrangement is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle comprising
   a frame;
   front and rear wheels resiliently mounted to said frame;
   an engine mounted to said frame between said front and rear wheels;
   a fuel tank mounted above said engine;
   a radiator mounted above said front wheel in front of said fuel tank and having a water supply opening; and
   a radiator baffle plate positioned above said radiator and including a downwardly extending panel between said radiator and said fuel tank, extending rearwardly to either side of the forward portion of said fuel tank, and an access port through said baffle plate above said water supply opening of said radiator.

2. The motorcycle of claim 1 further comprising a cowling extending from forwardly of said radiator to at least adjacent said downwardly extending panel on either side of said fuel tank.

3. The motorcycle of claim 2 wherein said radiator baffle plate further includes first and second partition plates extending from the upper extent of said downwardly extending panel on either side of said fuel tank to said cowling.

4. The motorcycle of claim 2 wherein said cowling further includes air inlet ports forwardly of said radiator on said motorcycle.

* * * * *